United States Patent Office 3,248,458
Patented Apr. 26, 1966

3,248,458
ORGANIC PHOSPHORUS ESTERS AND ANHYDRIDES
Günter Oertel, Cologne-Flittard, Hugo Malz, Leverkusen-Wiesdorf, and Hans Holtschmidt, Cologne-Stammheim, Germany, assignors to Farbenfabriken Bayer Aktiengesellschaft, Leverkusen, Germany, a German corporation
No Drawing. Filed Oct. 23, 1962, Ser. No. 232,593
Claims priority, application Germany, Oct. 24, 1961, F 35,194
2 Claims. (Cl. 260—935)

The present invention relates to and has as its objects new and useful phosphorus containing compounds. More specifically this invention is concerned with reaction products of compounds of trivalent phosphorus, which contain at least one phosphorus-nitrogen bond, with organic or inorganic acid anhydrides as well as processes for the production thereof.

In accordance with the present invention it has been found that novel insecticidally active organic phosphorus compounds are obtained if compounds of trivalent phosphorus, which contain at least one phosphorus-nitrogen bond, are brought to reaction with organic or inorganic acid anhydrides.

Suitable compounds of trivalent phosphorus, suitable as starting materials for the inventive process are, for example:

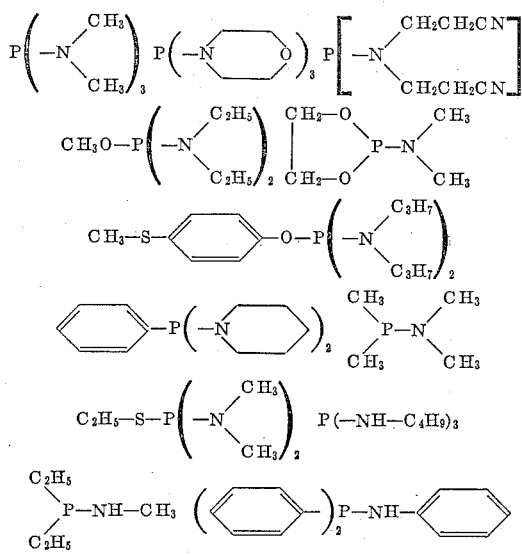

Among the acid anhydrides which are suitable for the reaction according to the invention, the following compounds may for example be mentioned:

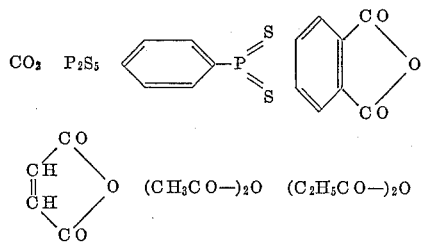

and the like.

The reaction according to the inventive process in general proceeds strongly exothermally, so that the use of inert diluents and/or cooling of the reaction mixture is recommended.

The molar proportions, within which the components are brought to reaction, depend on the number of phosphorus-nitrogen bonds present in the trivalent phosphorus compound. In the presence of several phosphorus-nitrogen bonds within one molecule, the reaction can generally also be conducted so that these linkages are brought to reaction by stages.

The reaction is effected by the action of one molecule of the acid anhydride on one phosphorus-nitrogen bond and, as illustrated in detail in the following examples, it leads to mixed anhydrides of phosphorous containing acids or their derivatives and the corresponding inorganic or organic acids.

The products obtainable according to the present invention constitute novel and definite organic compounds, which are distillable or crystallisable in most cases, and are stable to storage practically without any limit. They exhibit the usual reaction behaviour of trivalent phosphorus compounds and, i.e., can be converted to the corresponding derivatives of thiophosphoric acid, for instance with elementary sulphur. The inventive compounds are distinguished by outstanding pesticidal, preferably insecticidal properties and therefore are intended to be applied as pest control agents especially in plant protection. Moreover they are also suitable as intermediate products for syntheses in phosphorus chemistry.

The new compounds of the present invention very effectively kill insects like aphids, spider mites, caterpillars, flies, etc. They distinguish themselves especially by a good contact-insecticidal activity and mostly also by a systemic action. At the same time they have an activity on eating insects such as caterpillars. Most surprisingly they are of remarkably low toxicity against mammals. They may be used in the same manner as other known phosphoric insecticides, i.e., in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae (1) 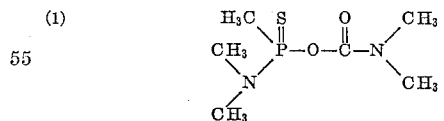

(II) 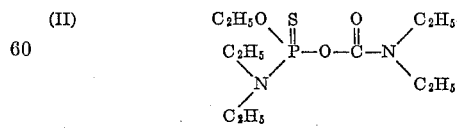

have been tested against aphids, flies (Compounds I and II) and caterpillars (Compound II). Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at least with water to the desired concentration indicated in the following paragraphs.

The tests have been carried out as follows:

(a) Against aphids (species *Doralis fabae*): heavily infested bean plants (*Vicia faba*) have been sprayed drip wet with solutions as prepared above. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| I | 0.1 | 100 |
| II | 0.1 | 100 |

(b) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate (in percent) |
|---|---|---|
| II | 0.1 | 100 |

(c) Against flies: 50 flies of the species *Drosophila melanogaster* are placed into 250 cc. beakers, covered with filter papers of 7 cm. diameter, which have been treated with 1 cc. of the insecticidal solutions of concentrations as shown below. The living status of the flies has been determined after 24 hours. The following results have been obtained:

| Compound | Aqueous concentration (in percent active ingred-ient/water) | Killing rate (in percent) |
|---|---|---|
| I | 0.1 | 100 |
| II | 0.01 | 100 |

The invention is illustrated in more detail by the following examples.

*Example 1a*

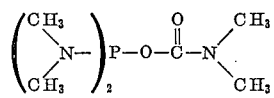

8.8 parts of carbon dioxide are passed into 32.6 parts of phosphorous acid-tris(-N,N-dimethylamide). It is ensured by means of cooling with ice water that the reaction temperature is between 20 and 50° C. When the above-mentioned amount of carbon dioxide has been absorbed, introduction of gas is stopped. The reaction product, which constitutes a colourless liquid, is distilled in vacuo.

B.P.=75° C./0.3 mm. Hg; $n_D^{20}$: 1.4755; yield: 35 parts (=85% of the theoretical).

*Analysis.*—(mol. weight 207).

|  | C | H | N | P |
|---|---|---|---|---|
| Calc., percent | 40.5 | 8.7 | 20.3 | 15.0 |
| Found, percent | 40.3 | 7.7 | 20.1 | 15.2 |

In the same manner there may be obtained the following compounds:

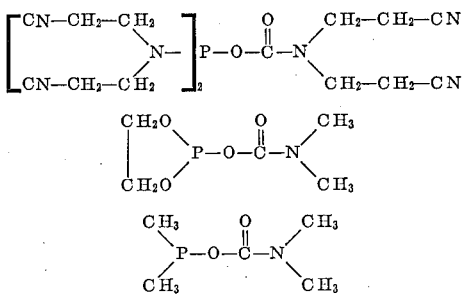

*Example 1b*

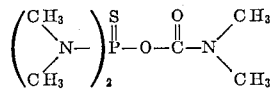

20.7 parts of the compound prepared according to Example 1a are dissolved in 50 parts by volume of benzene. 3.2 parts of sulphur powder are added to the solution at 40° C. The temperature of the reaction mixture is maintained at 50° C. by cooling. When the reaction has subsided, the clear solution is evaporated in vacuo, and the residue distilled in a high vacuum. 18 parts (=75% of the theoretical yield) of a colourless oil are obtained as the distillate. B.P.=109° C./0.15 mm. Hg.

*Analysis.*—(mol. weight 239).

|  | C | H | N | P | S |
|---|---|---|---|---|---|
| Calc., percent | 35.2 | 7.5 | 17.6 | 13.0 | 13.4 |
| Found, percent | 35.3 | 7.6 | 17.5 | 13.2 | 13.5 |

By exactly the same methods there may be produced the following compounds:

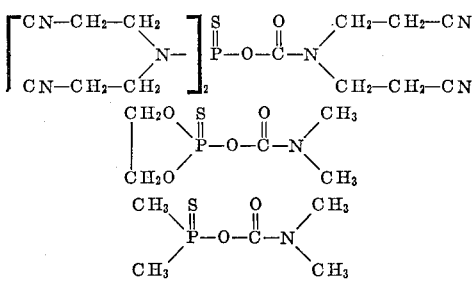

*Example 2*

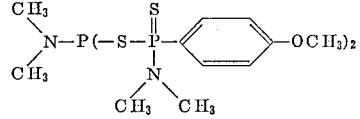

81 parts of p-methoxyphenyl-dithiophosphonic acid anhydride are introduced, by portions, at 40° C., into 32.6 parts of phorous acid-tris-(-N,N-dimethylamide) in 100 parts by volume of benzene, when an exothermal reaction results and the anhydride passes into solution. When the reaction has subsided, the clear solution is heated to boiling for 1 hour and evaporated in vacuo. 113 parts of a red oil remain as the residue.

*Analysis.—*

|  | C | H | N | P | S |
|---|---|---|---|---|---|
| Calc., percent | 42.4 | 5.6 | 7.4 | 16.4 | 22.6 |
| Found, percent | 42.6 | 5.7 | 7.2 | 16.9 | 22.0 |

By an analogous method, the compound of formula

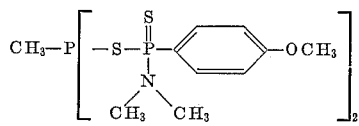

is obtained by the reaction of methylphosphonous acid-bis- (N,N-dimethylamide) and p-methoxyphenyl-dithiophosphonic acid anhydride, as a yellow viscous oil at a yield of 100% of the theoretical amount.

Furthermore the following compounds may be produced by the same methods:

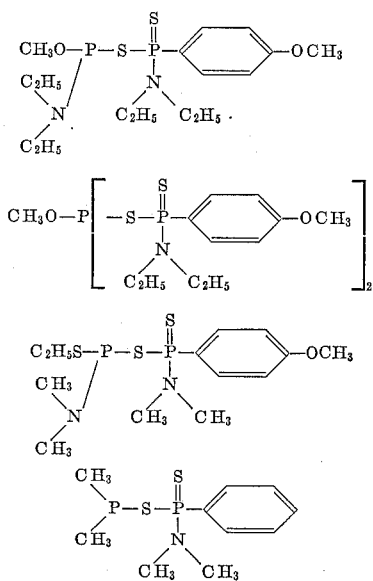

*Example 3a*

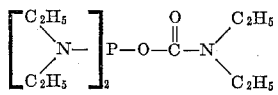

8.8 parts of gaseous carbon dioxide are passed, into 49.2 parts of phosphorous acid-tris(N,N-diethylamide) at 20 to 40° C. The carbon dioxide is absorbed, whilst an exothermal reaction occurs. The reaction product is a colourless liquid and is distilled in vacuo.

B.P.=122° C./0.25 mm. Hg; $n_D^{20}$: 1.4706; yield: 41 parts (=71% of the theoretical amount) of a colourless liquid.

*Analysis.—*(mol. weight 291)

|  | C | H | N | P |
|---|---|---|---|---|
| Calc., percent | 53.5 | 10.3 | 14.4 | 10.7 |
| Found, percent | 53.4 | 10.4 | 14.4 | 10.9 |

In the same way there may be obtained the following compounds:

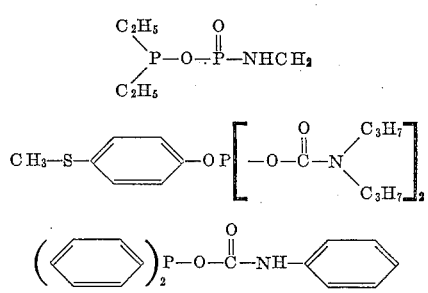

*Example 3b*

29 parts of the compound of the formula as given in Example 3a are dissolved in 50 parts by volume of benzene. 3.2 parts of sulphur powder are added to this solution at 40 to 50° C. with external cooling. When the exothermal reaction which occurs has subsided, the clear solution is evaporated in vacuo, and the remaining residue is distilled under strongly reduced pressure. 24 parts (75% of the theoretical yield) of a product with the following constitution are obtained as the distillate

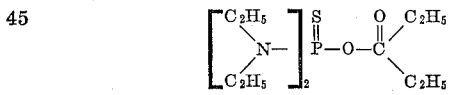

in the form of a colourless oil of B.P. 135 to 136° C./0.15 mm. Hg and a refractive index $n_D^{20}$ 1.4935.

*Analysis.—*

|  | C | H | N | P | S |
|---|---|---|---|---|---|
| Calc. (for mol. weight 323) percent | 48.4 | 9.3 | 13.0 | 9.6 | 9.9 |
| Found, percent | 48.8 | 9.6 | 13.0 | 9.8 | 10.0 |

The following compounds can be prepared by analogous method to that described above:

| Constitution | Boiling point [° C.] | Pressure [mm. Hg.] | Refractive index [$n_D^{20}$] | Yield [percent of theoretical] |
|---|---|---|---|---|
| (structure: CH₃, CH₃, P—O—C—N with CH₃, CH₃, N, CH₃) | Colourless liquid 103. | 13 | 1.4710 | 89 |

| Constitution | Physical properties | | | | Biological properties | | |
|---|---|---|---|---|---|---|---|
| | | B.P. [° C.] | $n_D^{20}$ | Yield [percent of theoretical] | Application against | Conc. of agent [percent] | Killing of pests [percent] |
| $CH_3-\overset{\overset{S}{\|}}{\underset{\underset{CH_3}{\|}}{P}}-O-\overset{\overset{O}{\|}}{C}-N\overset{CH_3}{\underset{CH_3}{\diagdown}}$ <br> $CH_3-N$ | Colourless oil | 93/0.1 mm. Hg | 1.511 | 81 | Flies (*drosophila*) Aphids (*D. fabae*) Aphids (*S. granarim* F, systemic activity) | 0.1<br>0.1<br><br>0.1 | 100<br>100<br><br>100 |
| $C_2H_5O\diagdown \overset{\overset{O}{\|}}{P}-O-\overset{\overset{O}{\|}}{C}-N\diagup^{C_2H_5}$ <br> $C_2H_5-N$ <br> $C_2H_5$ | Colourless liquid | 84-85/0.15 mm. Hg | 1.4562 | 78 | | | |
| $C_2H_5O\diagdown \overset{\overset{S}{\|}}{P}-O-\overset{\overset{O}{\|}}{C}-N\diagup^{C_2H_5}$ <br> $C_2H_5-N$ <br> $C_2H_5$ | Colourless oil | 122/0.2 mm. Hg | 1.479 | 80 | Flies (*drosophila*)<br>Aphids (*D. fabae*)<br>Caterpillars (*P. maculinnis*)<br>Bedbugs<br>Grain weevils<br>Mosquitoes<br>Mosquito larvae | 0.01<br>0.1<br>0.1<br>0.1<br>0.1<br>0.01<br>0.001 | 100<br>100<br>100<br>100<br>100<br>100<br>100 |
| $C_2H_5O\diagdown \overset{\overset{O}{\|}}{P}-O-\overset{\overset{O}{\|}}{C}-N\diagup^{CH_3}$ <br> $C_2H_5O\diagup$ | Colourless liquid | 71/0.15 mm. Hg | 1.4471 | 57 | | | |
| $C_2H_5O\diagdown \overset{\overset{O}{\|}}{P}-O-\overset{\overset{O}{\|}}{C}-N\diagup^{C_2H_5}$ <br> $C_2H_5O\diagup$ | Colourless liquid | 91/0.45 mm. Hg | 1.4440 | | | | |

Example 4

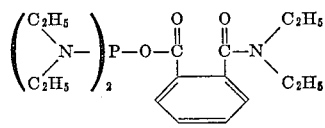

24.7 parts of phosphorous acid-tris-(N,N-diethylamide) are dissolved in 100 parts by volume of benzene. 14.8 parts of phthalic acid anhydride are introduced into this solution at 40° C., with cooling. When the exothermal reaction has subsided, a clear, pale yellow colored solution results, which is heated to boiling for a short time and then evaporated in vacuo at a bath temperature of 100° C. 39.5 parts of a yellow, clear oil remains as the residue.

*Analysis.*—

| | C | H | N | P |
|---|---|---|---|---|
| Calc., percent | 60.8 | 8.6 | 10.5 | 7.8 |
| Found, percent | 60.8 | 8.6 | 10.0 | 7.6 |

By exactly the same methods there may be produced the following compounds:

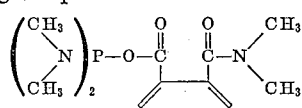

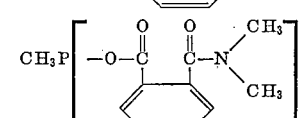

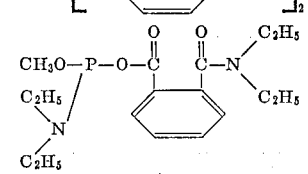

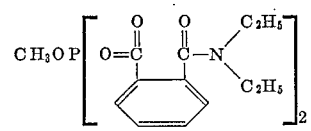

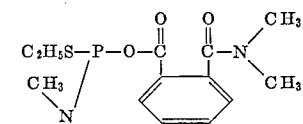

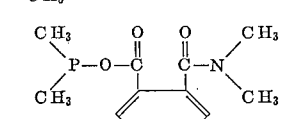

Example 5

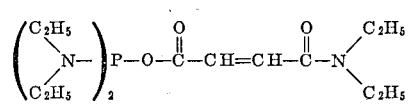

9.8 parts of maleic acid anhydride are introduced at 50° C. into a solution of 24.7 parts of phosphorous acid-tris-(N,N-diethylamide, in 100 parts by volume of benzene. Owing to the very vigorous prigress of the reaction, good cooling of the reaction mixture must be ensured during this process. When the anhydride has been introduced, a deep-red coloured solution results, which is heated to boiling for a short time and then evaporated in vacuo. 34 parts of a red oil remain as the residue.

*Analysis.*—

| | C | H | N | P |
|---|---|---|---|---|
| Calc., percent | 55.4 | 9.3 | 12.2 | 9.0 |
| Found, percent | 55.3 | 9.3 | 11.8 | 9.1 |

In the same way there may be obtained the following compounds:

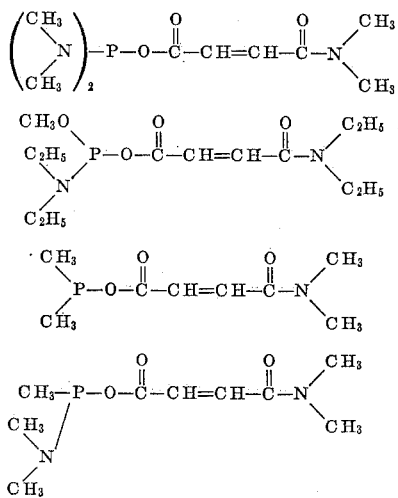

*Example 6*

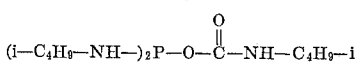

Carbon dioxide in gaseous form is passed, into a solution of 12.5 parts of phosphorous acid-tris-(N-isobutylamide) in 50 parts by volume of benzene at 40° C. When 2.2 parts of carbon dioxide have been absorbed by the solution by an exothermal reaction, the passage of gas is stopped. The clear solution is evaporated in vacuo, and 14.7 parts of a viscous colourless oil remain as the residue.

In the same manner there may be produced the following compounds:

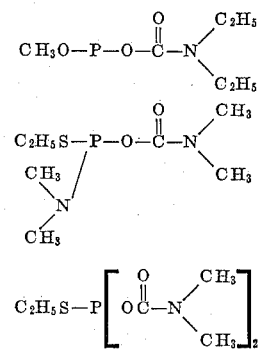

*Example 7*

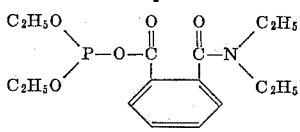

14.8 parts of finely powdered phthalic acid anhdyride are introduced at 20 to 60° C. into a solution of 19.3 parts of phosphorous acid-O,O-diethyl ester-N,N-diethylamide in 50 parts by volume of benzene, with external cooling. A very vigorous reaction ensues, the phthalic acid anhydride being dissolved and a clear solution being formed. When the latter is evaporated, 34 parts of the compound with the above constitution is obtained in the form of a yellow oil.

Grain weevils, caterpillars (*Plutella maculipennis*), and flies (*Drosophila melanogaster*) are 100% killed by 0.01% solutions of the product, and mosquito larvae still by 0.0001% solutions, whilst aphids (*Doralis fabae*) are 100% destroyed by 0.1% solutions. In addition, the compound has a 100% systemic activity towards aphids on oats (*Sitobium granarium*) when applied at a concentration of 0.1%.

*Example 8a*

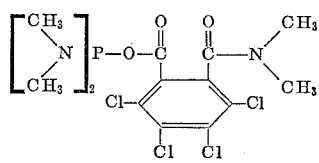

28.6 parts of finely powdered tetrachlorophthalic acid anhydride are introduced into a solution of 16.3 parts of phosphorus acid-tris-(N,N-dimethylamide) in 50 parts by volume of benzene at 40 to 50° C., with good external cooling. When the ensuing strongly exothermal reaction has subsided, the clear yellow solution is evaporated in vacuo. 45 parts of the compound of the above structure remain as the residue, in the form of a clear yellow oil.

*Example 8b*

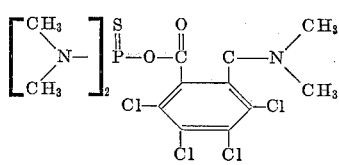

45 parts of the compound of the formula as given in Example 2 are dissolved in 50 parts by volume of benzene. This solution is treated at 50 to 70° C. with 3.2 parts of sulphur powder, with external cooling, when a vigorous reaction takes place. Subsequently the mixture is evaporated in vacuo. 48 parts of the compound of the above formula are obtained as the residue in the form of a red, very viscous oil.

By an analogous method to that described above, the compounds of the following formulae can be prepared:

| Constitution | Physical properties |
|---|---|
| $C_2H_5O$, $CH_3$, N($CH_3$)–P–O–C(O)–C(O)–N($CH_3$)$_2$, tetrachlorophenyl | Yellow oil. |
| $C_2H_5O$, $CH_3$, N($CH_3$)–P(S)–O–C(O)–C(O)–N($CH_3$)$_2$, tetrachlorophenyl | Yellow viscous oil. |
| $C_2H_5$, $CH_3$, N($CH_3$)–P–O–C(O)–C(O)–N($CH_3$)$_2$, tetrachlorophenyl | Yellow oil. |
| $C_2H_5$, $CH_3$, N($CH_3$)–P–O–C(O)–C(O)–N($CH_3$)$_2$, tetrachlorophenyl | Red, very viscous oil. |
| $C_2H_5O$, $C_2H_5O$, P(S)–O–C(O)–C(O)–N($C_2H_5$)$_2$, tetrachlorophenyl | Yellow oil. |

Example 9a

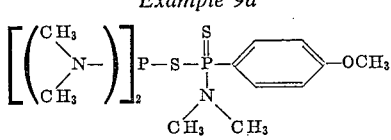

40.4 parts of p-methoxyphenyl-dithiophosphonic acid anhydride are introduced at 30 to 40° C., with cooling, into a solution of 32.6 parts of phosphorous acid-tris-(N,N-dimethylamide) in 50 parts by volume of benzene. When the ensuing very vigorous reaction has subsided, the solution is still heated to 80° C. for a short time, and then evaporated in vacuo. 73 parts of the compound of the above constitution remain as the residue, in the form of a brown oil.

Example 9b

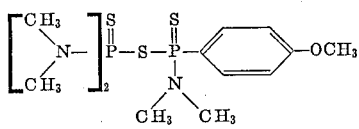

36.5 parts of the product obtained according to Example 9a are dissolved in 100 parts by volume of benzene. 3.2 parts of sulphur powder are introduced into this solution, whilst care is taken, by external cooling of the mixture with ice water, that the reaction temperature varies between 30 and 50° C. When the reaction is completed, a clear yellow solution results, which is evaporated in vacuo. 39.8 parts of the compound of the formula as given above remain as the residue, in the form of a brown viscous oil. By an analog method to that described above, a compound of the formula

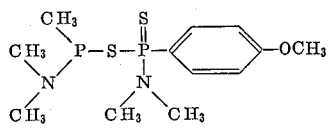

is obtained from methyl-phosphonous acid-bis(N,N-dimethylamide) and an equimolar amount of p-methoxyphenyl-dithiophosphonic acid anhydride, as a yellow brown clear oil.

Example 10

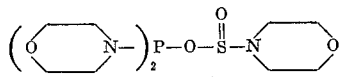

Sulphur dioxide is passed with stirring into a suspension of 28.9 parts of phosphorous acid-trimorpholid in 150 parts by volume of benzene, whilst the temperature of the mixture is maintained below 40° C. by external cooling with water. After passing in for about 5 minutes, 6.4 parts of sulphur dioxide have been absorbed, and the trimorpholide has completely passed into solution. The reaction mixture is stirred for some time longer, when a light yellow oil separates from the solution. The latter is separated and washed with water, when it crystallises. Colourless crystals of M.P. 140 to 144° C. are obtained. When the benzene solution has been evaporated, an oily residue is obtained, which also solidifies as crystals on trituration with alcohol. The resulting colourless crystals also melt at 140 to 144° C.

By exactly the same methods there may be obtained the following compounds:

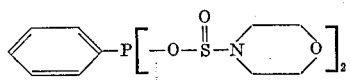

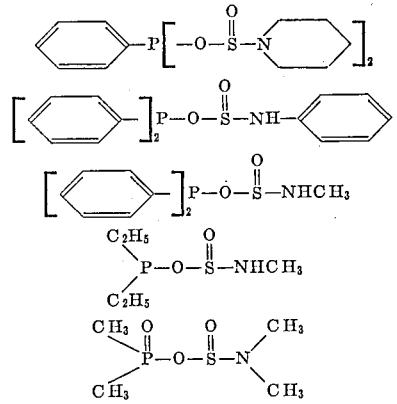

The statements of amounts specified in the examples are to be interpreted as parts by weight if it has not been indicated otherwise.

We claim:
1. A compound of the formula:

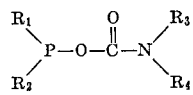

in which $R_1$ and $R_2$ stand for members selected from the group consisting of lower alkyl having up to 4 carbon atoms, lower alkoxy having up to 4 carbon atoms, lower alkyl mercapto having up to 4 carbon atoms, lower alkyl amino having up to 4 carbon atoms, lower dialkylamino having up to 4 carbon atoms in each alkyl group, phenyl, phenoxy, lower alkoxy substituted phenoxy, lower alkyl mercapto substituted phenoxy, phenylamino, morpholyl piperidyl and a further

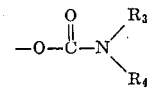

group; and in which $R_3$ and $R_4$ stand for a member selected from the group consisting of hydrogen, lower alkyl having up to 4 carbon atoms, cyano substituted lower alkyl, phenyl and the group

furthermore stands for a member selected from the group consisting of morpholyl and piperidyl.

2. The compound of the formula:

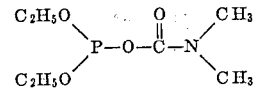

References Cited by the Examiner

UNITED STATES PATENTS

| | | | |
|---|---|---|---|
| 2,354,536 | 7/1944 | Nelson | 260—461 |
| 2,648,696 | 8/1953 | Whetstone | 260—461 |
| 2,743,235 | 4/1956 | McDermott | 260—461 |
| 3,009,940 | 11/1961 | Tiles | 260—461 |

FOREIGN PATENTS 835,302    3/1952    Germany.

CHARLES B. PARKER, *Primary Examiner.*

IRVING MARCUS, *Examiner.*